(12) United States Patent
Kashima

(10) Patent No.: US 10,764,372 B2
(45) Date of Patent: Sep. 1, 2020

(54) VEHICULAR COMMUNICATION DEVICE

(71) Applicant: DENSO CORPORATION, Kariya, Aichi-pref. (JP)

(72) Inventor: Hideki Kashima, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/262,028

(22) Filed: Jan. 30, 2019

(65) Prior Publication Data

US 2019/0349432 A1  Nov. 14, 2019

(30) Foreign Application Priority Data

May 9, 2018  (JP) .................................. 2018-90702

(51) Int. Cl.
```
H04L 29/08      (2006.01)
B60R 16/033     (2006.01)
H02J 7/00       (2006.01)
H04B 1/38       (2015.01)
```

(52) U.S. Cl.
CPC ............ *H04L 67/12* (2013.01); *B60R 16/033* (2013.01); *H02J 7/007* (2013.01); *H04B 1/38* (2013.01)

(58) Field of Classification Search
CPC ... H04L 67/12–67/125; B60R 16/033–16/037; H02J 7/007; H04B 1/38
See application file for complete search history.

(56) References Cited

U.S. PATENT DOCUMENTS

| | | | |
|---|---|---|---|
| 2013/0197712 A1* | 8/2013 | Matsuura | B60R 25/24 701/1 |
| 2015/0154016 A1* | 6/2015 | Liang | G06F 8/65 717/169 |
| 2017/0351445 A1* | 12/2017 | Shimomura | B60R 16/0231 |

FOREIGN PATENT DOCUMENTS

| | | |
|---|---|---|
| JP | 2008-155892 A | 7/2008 |
| JP | 2010-019175 A | 1/2010 |
| JP | 2013-084143 A | 5/2013 |

* cited by examiner

*Primary Examiner* — Clayton R Williams
(74) *Attorney, Agent, or Firm* — Posz Law Group, PLC

(57) ABSTRACT

A vehicular communication device is communicable with each of an external communication device disposed outside a vehicle and at least one electronic control device. The vehicular communication device: receives the data from the external communication device and transmits the data to the at least one electronic control device; calculates an estimated power amount for writing the data into the at least one electronic control device; obtains a remaining battery power in a battery; and determines execution or suspension of data transfer.

9 Claims, 7 Drawing Sheets

VEHICULAR COMMUNICATION DEVICE

CROSS REFERENCE TO RELATED APPLICATION

The present application claims the benefit of priority from Japanese Patent Application No. 2018-90702 filed on May 9, 2018. The entire disclosure of the above application is incorporated herein by reference.

TECHNICAL FIELD

The present disclosure relates to a vehicular communication device.

BACKGROUND

For example, a transceiver mounted on a vehicle receives data transmitted from a wireless communication device outside the vehicle, transmits the received data to a controller in the vehicle, and controls the controller to write the data.

SUMMARY

According to an example aspect of the present disclosure, a vehicular communication device is communicable with each of an external communication device disposed outside a vehicle and at least one electronic control device. The vehicular communication device: receives the data from the external communication device and transmits the data to the at least one electronic control device; calculates an estimated power amount for writing the data into the at least one electronic control device; obtains a remaining battery power in a battery; and determines execution or suspension of data transfer.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
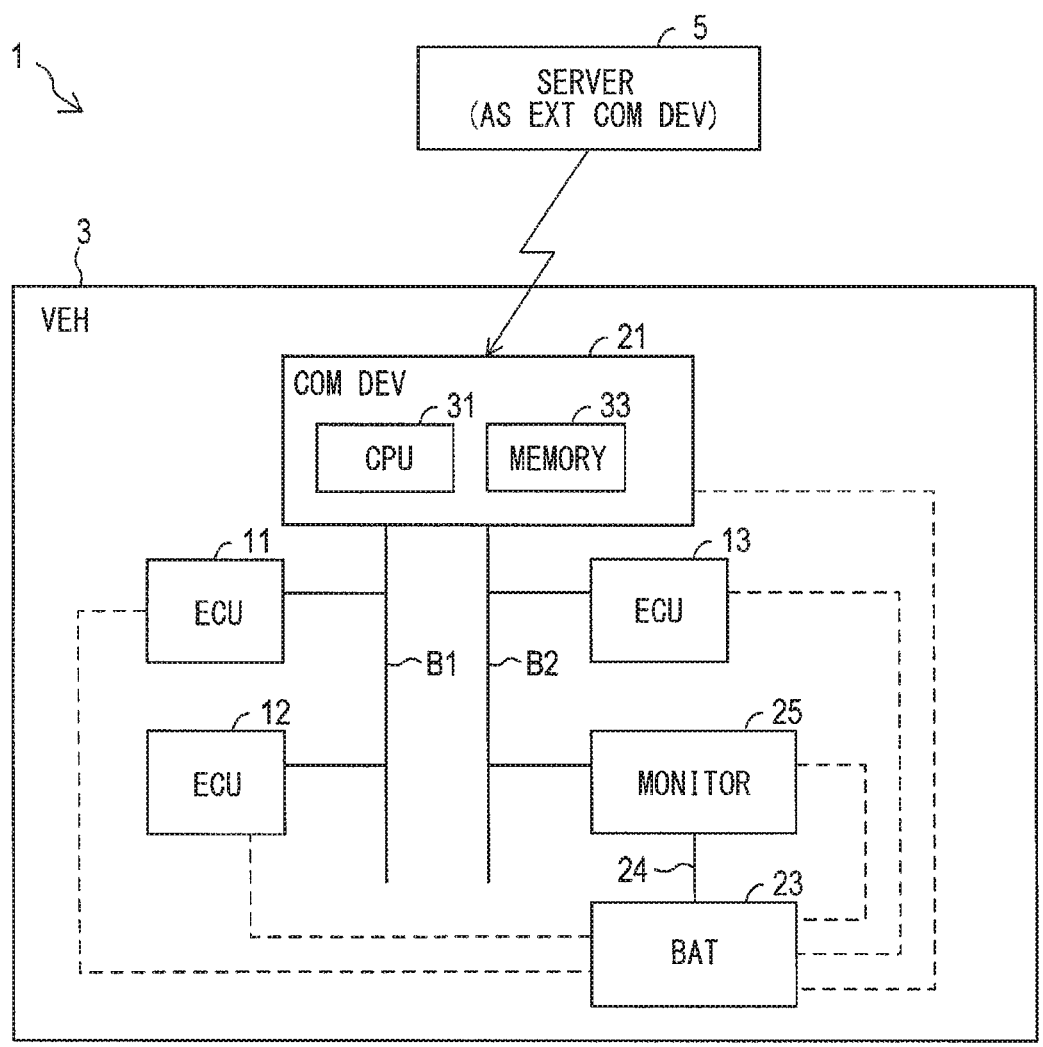
FIG. 1 is a block diagram showing a configuration of a data writing system according to a first embodiment.

As a result of detailed examination by the inventor, the following difficulties were found.

Transferring and writing data as writing target data from an external communication device disposed outside the vehicle into any one of a plurality of electronic control devices installed in the vehicle is supposed to be executed when the engine of the vehicle stops.

For this reason, in a vehicle, at least an electronic control device (hereinafter referred to as a writing target device) to which data is to be written and an vehicular communication device that receives the writing target data from the external communication device and transmits the data to the writing target device, are in operation while the engine stops. Therefore, there is a concern that the amount of electric power (hereinafter referred to as "battery remaining amount") accumulated in the battery as a power supply source to each device mounted in the vehicle may be exhausted.

In order to prevent exhaustion of the battery remaining amount (that is, to prevent battery dead), for example, when the remaining battery level is smaller than a predetermined threshold value, it is considered that the vehicular communication device does not execute the transfer (i.e., the reception and transmission) of the writing target data. This is because at least the operation of the writing target device can be stopped unless the transfer of the writing target data is not executed.

However, since the amount of electric power required to write the writing target data from the external communication device to the writing target device varies with, for example, the amount of the writing target data or the transfer speed, the above threshold value is set to a value that does not cause exhaustion of the remaining battery power in all expected cases. Then, there is a possibility that the transfer of the writing target data is excessively stopped. For example, even when the battery remaining amount slightly lowers, the writing to the writing target device may not be performed even with a small amount of data.

In view of the above, a vehicular communication device is provided such that the device performs data writing from the external communication device to the electronic control device of the vehicle as much as possible within a range in which the battery remaining amount is not exhausted.

According to an example aspect, a vehicular communication device is communicable with each of an external communication device disposed outside a vehicle and at least one electronic control device. The vehicular communication device includes a transfer unit, a calculator, and a determination unit.

The transfer unit receives the write target data for the write target device, which is at least one of the at least one electronic control device, from the external communication device and transmits the write target data to the write target device to write the write target data into the write target device.

The calculator calculates an estimated power amount which is an estimated value of the electric power consumption amount in the vehicle, which is necessary for writing the write target data from the external communication device into the write target device via the vehicular communication device.

The determination unit obtains the remaining battery power which is the amount of electric power stored in the battery as the power supply source for supplying the electric power to the at least one electronic control unit and the vehicular communication device. Then, the determination unit determines execution or suspension of the write data transfer, based on the obtained battery remaining amount and the estimated electric power consumption amount calculated by the calculator.

According to such a configuration, execution or stop of the write data transfer is determined based on the expected electric power consumption amount and the battery remaining amount, so that the data writing from the external communication device to the electronic control unit of the vehicle is performed as much as possible within a range that does not cause exhaustion of the battery remaining amount. For example, when the determining unit determines that the remaining battery power is larger than the estimated electric power consumption amount, based on the battery remaining amount and the estimated power amount, the determining unit controls the transfer unit to perform the write data transfer, and when the determining unit determines that the remaining battery power is not larger than the estimated electric power consumption amount, the writing data transfer may be stopped.

Embodiments of the present disclosure will be described below with reference to the drawings.

First Embodiment

The data writing system 1 according to the first embodiment shown in FIG. 1 is a system for writing write target data transmitted wirelessly from a server 5 as an external communication device disposed outside the vehicle 3 into at least one of a plurality of electronic control units (hereinafter referred to as ECU). The ECU is an abbreviation for "Electronic Control Unit".

In the vehicle 3, ECUs 11 to 13 are mounted as a plurality of ECUs. The vehicle 3 is wirelessly communicated with the server 5, and an vehicular communication device (hereinafter referred to as a communication device) 21 that communicates with the ECUs 11 to 13 via any of the communication buses B1 and B2 in the vehicle is mounted in the vehicle 3. Incidentally, the number of ECUs may be a plural numerical number other than 3 or the number of ECUs may be 1. Also, the number of communication buses may be a plural numerical number other than 2, or the number of the buses may be 1.

In the vehicle 3, a battery 23 as a power supply source for supplying electric power for operation to the respective devices in the vehicle 3 including the ECUs 11 to 13 and the communication device 21, and a monitor 25 for monitoring the state of the battery 23 are mounted. The battery 23 is a so-called in-vehicle battery that is charged by the driving power of the engine of the vehicle.

The monitor 25 sequentially acquires information, such as the input/output current and the voltage of the battery 23, from the battery 23 via the communication line 24, and based on the acquired information, the monitor 25 calculates the amount of electric power stored in the battery 23 (Hereinafter referred to as a battery remaining amount). The communication device 21 also communicates with the monitor 25 via the communication bus B2, for example, and acquires the battery remaining amount from the monitor 25. The monitor 25 also operates with the electric power from the battery 23. The dotted line in FIG. 1 indicates that the electric power is supplied from the battery 23.

The communication device 21 includes a microcomputer having a CPU 31 and a semiconductor memory (hereinafter, a memory) 33 such as RAM or ROM. Each function of the communication device 21 is executed by the CPU 31 for executing a program stored in a non-transitory tangible storage medium. In this example, the memory 33 corresponds to a non-transitory tangible storage medium for storing a program. When the execution of the program, a method corresponding to the program is executed. The communication device 21 may include one microcomputer or a plurality of microcomputers. In addition, the method of executing each function of the communication device 21 is not limited to software, and a part or all of its functions may be executed by using one or plural hardware. For example, when the above-described function is realized by an electronic circuit which is hardware, the electronic circuit may be realized by a digital circuit, an analog circuit, or a combination thereof. Though not shown, each of the ECUs 11 to 13 also includes a microcomputer having a CPU and a memory.

Figure 2:
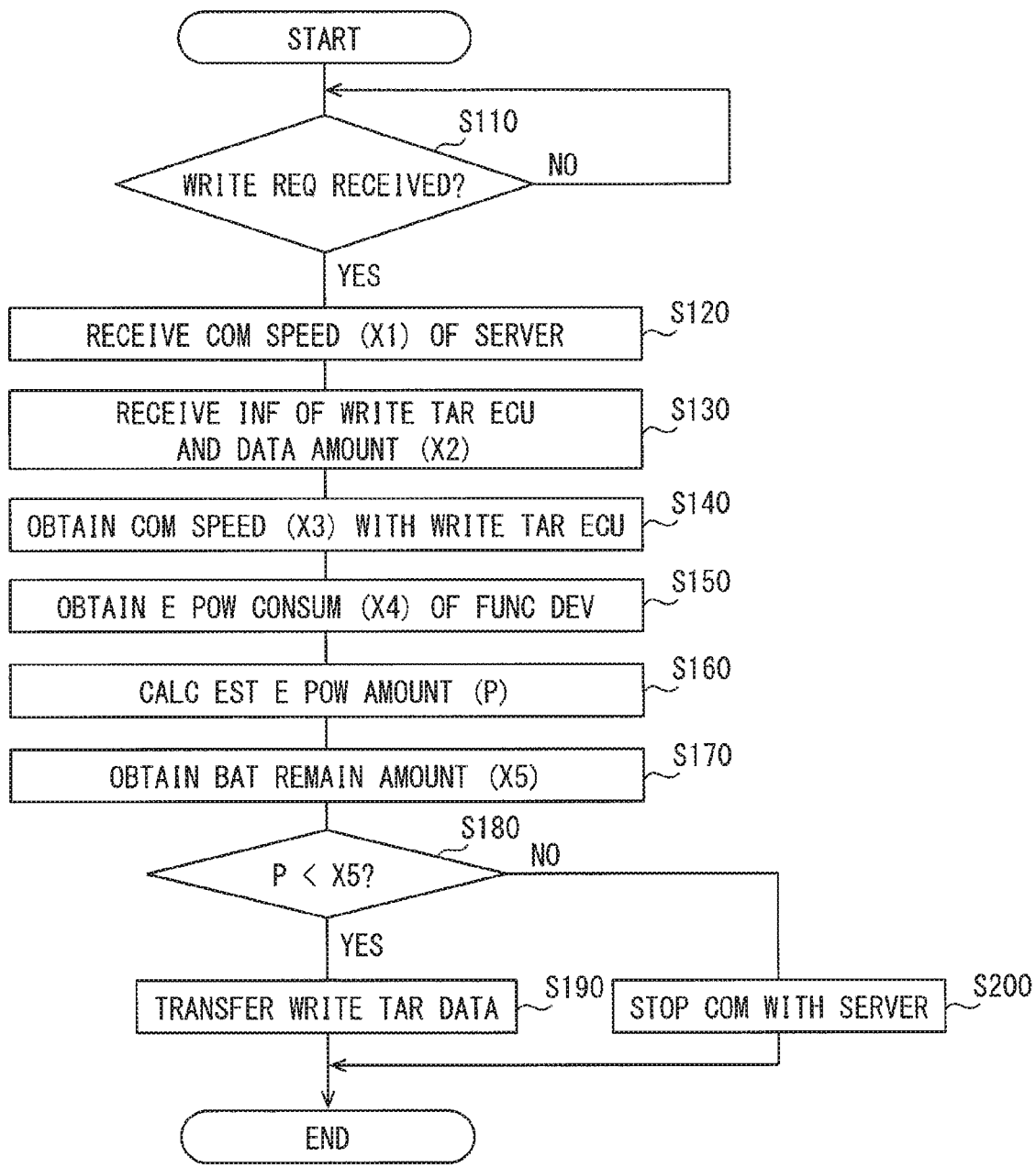
FIG. 2 is a flowchart of a process performed by the communication device of the first embodiment.

Next, the process executed by the communication device 21 will be described with reference to the flowchart of FIG. 2. Here, the process of FIG. 2 is executed when the engine of the vehicle 3 stops. In addition, the operation of the communication device 21 is realized by the CPU 31 for executing a program in the memory 33.

As shown in FIG. 2, the communication device 21 determines whether a write request from the server 5 is received in S110, and waits until this write request is received.

When determining that the write request from the server 5 has been received in S110, the communication device 21 receives the communication speed X1 of the server 5 as information from the server 5 in the next S120. There are a plurality of communication speeds of the server 5 that is likely to communicate with the communication device 21 so that the communication device 21 is configured to be able to communicate with each of the plurality of communication speeds. Therefore, the communication speed X1 received from the server 5 is the communication speed between the server 5 and the communication device 21. Here, the communication device 21 may acquire the communication speed with the server 5 by actual measurement.

In the next step S130, the communication device 21 acquires information indicating the ECU (hereinafter referred to as the write target ECU) to be written and the amount of the write target data to be written in the write target ECU as the data amount X2, as information from the server 5. Here, the write target data is, for example, a new program or control data.

In step S140, the communication device 21 acquires the communication speed X3 between the write target ECU and the communication device 21. For example, in the memory 33 of the communication device 21, the communication speeds between the ECUs 11 to 13 and the communication device 21 are stored in advance. Therefore, in S140, the communication speed stored for the write target ECU is read out from the memory 33. It should be noted that the communication device 21 may be configured to actually measure the communication speed with each of the ECUs 11 to 13 and store them in the memory 33.

In step S150, the communication device 21 acquires the electric power consumption X4 of the operating device.

An operating device is a device that operates in the case of transferring and writing the write target data from the server 5 to the write target ECU in the vehicle. In the present embodiment, the devices to be operated are the write target ECU, the communication device 21, and the monitor 25. In addition, the communication device 21 obtains the value of the electric power consumption of the device mounted on the vehicle 3 in advance by communication or the like, and stores the acquired value of each electric power consumption in the memory 33 or the like. The value of the electric power consumption of the communication device 21 is also stored in the memory 33 or the like. Then, in S150, the communication device 21 calculates the total value of the electric power consumptions of the operating devices. Here, when there is a devices other than the write target ECU, the communication device 21 and the monitor 25 as the operating device, the electric power consumption of the other device is also added as the total value.

In the next step S160, the communication device 21 calculates the estimated electric power amount P according to the communication speed X1 with the server 5, the data amount X2, the communication speed X3 with the write target ECU and the electric power consumption X4 of the operating devices. The estimated electric power amount P is an estimation value of the electric power consumption amount in the vehicle 3 necessary for writing the write target data from the server 5 to the write target ECU via the communication device 21.

Specifically, in S160, the communication device 21 first calculates the transfer time T of the write target data by the following equation 1. The transfer time T referred to here is the time required for transferring the write target data from the server 5 to the write target ECU. Then, the communication device 21 calculates the estimated electric power amount P by the following equation 2. "*" In equation 2 indicates multiplication.

$$T=(X2/X1)+(X2/X3) \quad \text{Equation 1}$$

$$P=T*X4 \quad \text{Equation 2}$$

Here, the estimated electric power amount P may be calculated from one equation that combines the equation 1 and the equation 2. In the present embodiment, for example, the unit of the communication speeds X1 and X3 is "bit/second", the unit of the data amount X2 is "bit", and the unit of the transfer time T is "second". In the equation 1, "X2/X1" is the transfer time of the write target data from the server 5 to the communication device 21, "X2/X3" is the transfer time of the write target data from the communication device 21 to the write target ECU. Further, for example, the communication device 21 may be configured to transmit the write target data to the write target ECU after receiving the entire amount of the write target data from the server 5. Alternatively, the communication device 21 may repeat to transmit the predetermined amount of the write target data to the write target ECU every time the communication device 21 receives the predetermined amount of the write target data from the server 5. Thus, any way of transferring the write target data may be used.

In this embodiment, since the time Ta from completion of transfer of the write target data to the write target ECU until completion of writing of all the data in the write target ECU is approximately 0, the estimated electric power amount P is calculated by the above-mentioned equation 2. Here, "approximately 0" means to be negligibly small in calculating the estimated electric power amount P. On the other hand, if it is necessary to consider the above-mentioned time Ta, the communication device 21 may calculate the estimated electric power amount P using "T+Ta" instead of "T" in equation 2.

In step S170, the communication device 21 acquires the current battery remaining amount X5 from the monitor 25.

In the next step S180, the communication device 21 compares the battery remaining amount X5 acquired in step S170 with the estimated electric power amount P calculated in step S160, and in a case where it is determined that the battery remaining amount X5 is larger than the estimated electric power amount P, it is determined to perform the write data transfer with respect to the write target ECU, and the process proceeds to S190. The write data transfer is the transfer of the write target data from the server 5 to the write target ECU. Specifically, the write target data is received from the server 5, and the received write target data is transmitted to the write target ECU. Then, the communication device 21 transfers the write data at S190, and upon completing the transfer of the write data, the communication device 21 ends the process of FIG. 2.

Here, the write target ECU is activated by an activation signal from the communication device 21, for example, immediately before the start of the write data transfer for the write target ECU. For example, the communication device 21 transmits the activation signal to the write target ECU during a period from when it is determined to be YES in S180 to when the write data transfer is started in S190. Then, the write target ECU sequentially writes the write object data received from the communication device 21 in the memory provided in the write target ECU, and stops the operation when the writing of all the data is completed.

On the other hand, when the communication device 21 determines in S180 that the battery remaining amount X5 is not larger than the estimated electric power amount P, it decides to stop the write data transfer. Therefore, in this case, the communication device 21 proceeds to S200 without performing the write data transfer. Then, at S200, the communication device 21 stops communication with the server 5, and thereafter ends the processing of FIG. Here, even when the write data transfer is executed in S190, the communication device 21 stops communication with the server 5 when completing the process of FIG. 2.

According to the embodiment detailed above, the following effects may be obtained.

(1a) The communication device 21 does not compare the battery remaining amount with a fixed threshold value but calculates the estimated electric power amount, and based on the estimated electric power amount and the battery remaining amount, determines whether the write data transfer is executed or suspended. Therefore, it is possible to execute the data writing from the server 5 to any one of the ECUs 11 to 13 as much as possible within the range that does not cause the exhaustion of the battery remaining amount.

(1b) When the communication device 21 determines that the battery remaining amount is larger than the estimated electric power amount, the communication device 21 performs the write data transfer, and when the communication device 21 determines that the battery remaining amount is not larger than the estimated electric power amount, the communication device 21 stops the write data transfer, so that the effect of (1a) may be increased.

(1c) The communication device 21 calculates the estimated electric power amount according to a first communication speed which is a communication speed with the server 5, a second communication speed which is a communication speed with the write target ECU, a data amount of the write target data, the electric power consumption of the communication device 21 and the write target ECU. Therefore, the calculation accuracy of the estimated electric power amount is improved. Even when any one or more of the first communication speed, the second communication speed, the data amount, and the write target ECU is changed, it is easy to secure high calculation accuracy of the estimated electric power amount. Therefore, for example, even when the first communication speed is changed by the communication partner's server 5, the second communication speed is changed by the type of the vehicle 3, the data amount is changed, or the write target ECU is changed, the above described effect of (1a) is enhanced.

(1d) The communication device 21 calculates the transfer time of the write target data by using the first communication speed, the second communication speed, and the data amount, and calculates the estimated electric power amount using the transfer time and the electric power consumptions of the write target ECU and the communication device 21.

Therefore, it is easy to calculate the estimated electric power amount by a simple calculation. Here, the electric power consumption acquired in S150, that is, the electric power consumption of the operating device includes the electric power consumptions of the writing target ECU and the communication device 21.

(1e) The communication device 21 performs the processes of S160, S170, and S180 before starting the write data transfer in S190. Therefore, it is possible to avoid the execution of the write data transfer which may cause exhaustion of the battery remaining amount.

In the first embodiment, S190 corresponds to a process as a transfer unit, S160 corresponds to a process as a calculator, and S170 and S180 correspond to a process as a determination unit. Further, the write target ECU corresponds to the write target device.

Second Embodiment

Since the basic configuration of the second embodiment is similar to the first embodiment, the main difference will be described below. Note that the same reference numerals as those in the first embodiment indicate the same configuration, and refer to the preceding descriptions.

Figure 3:
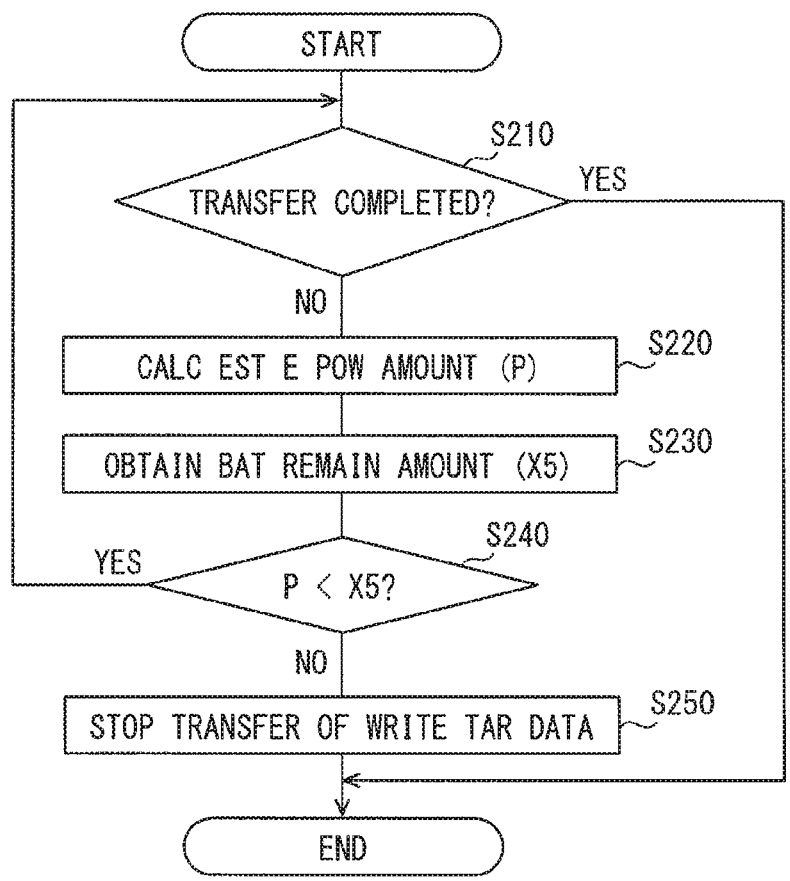
FIG. 3 is a flowchart of a process performed by the communication device of a second embodiment.

The communication device 21 of the second embodiment is different from the first embodiment in that the process of FIG. 3 is further performed. The process of FIG. 3 is performed in parallel with the write data transfer performed in S190 of FIG. 2, for example in a manner of a multitask procedure. That is, the process of FIG. 3 is performed during the execution period of the write data transfer.

As shown in FIG. 3, in S210, the communication device 21 determines whether the write data transfer has been completed. When it is determined that the write data transfer has not been completed, the communication device 21 goes to S220, and in S220, the communication device 21 calculates the estimated electric power amount P again.

However, since the process of S220 is performed during the execution period of the write data transfer, the estimated electric power amount P calculated in S220 is the currently estimated electric power amount at the present time. The present time referred to here is the time when the process of S220 is executed.

For example, it is assumed that the write target data amount which the communication device 21 has already received from the server 5 is defined as "X2r". Further, it is assumed that the write target data amount that the communication device 21 has already transmitted to the write target ECU is defined as "X2t".

The communication device 21 substitutes "(X2−X2r)/X1" for "X2/X1" in equation 1 and replaces "X2/X3" in Equation 1 with "(X2−X2t)/X3," so that the communication device 21 calculates the transfer time T. That is, the communication device 21 calculates the remaining transfer time T from the present time according to the following equation 3. Then, the communication device 21 calculates the estimated electric power amount P by substituting the remaining transfer time T calculated by equation 3 into equation 2.

$$T=((X2-X2r)/X1)+((X2-X2t)/X3) \qquad \text{Equation 3}$$

Then, in the following S230, the communication device 21 acquires the current battery remaining amount X5 from the monitor 25. In the next S240, the communication device 21 compares the battery remaining amount X5 acquired in S230 with the estimated electric power amount P calculated in S220.

When the communication device 21 determines in S240 that the battery remaining amount X5 is larger than the estimated electric power amount P, the communication device 21 determines to transfer the write data (that is, to continue transferring) to the write target ECU, and the process returns to S210.

When the communication device 21 determines in S240 that the battery remaining amount X5 is not greater than the estimated electric power amount P, the communication device 21 determines to stop (i.e., to suspend) the write data transfer. Then, in this case, the communication device 21 stops the transfer of the write data being executed at S250, and thereafter ends the process of FIG. 3.

In step S250, in addition to the stopping of the write data transfer, the communication device 21 stops the operation of the write target ECU by transmitting a stop command signal to the write target ECU. Also, when the write data transfer is stopped in S250, the process in FIG. 2 is also terminated. Therefore, the communication with the server 5 is also suspended.

On the other hand, when the communication device 21 determines in step S210 that the write data transfer has been completed, the communication device 21 ends the process of FIG. 3. Also in this case, the communication with the server 5 is stopped.

During the execution of the write data transfer, the communication device 21 of the second embodiment repeats the process of S200 to 240 and calculates the estimated electric power amount P from the present time at S200. Therefore, according to the communication device 21 of the second embodiment, in addition to the effects of the above-described first embodiment, the following effects are further provided.

According to the communication device 21 of the second embodiment, in a case where the battery remaining amount decreases more than expected due to some incident during the execution of the write data transfer, and the possibility of exhausting the battery remaining amount would be increased if the write data transfer is continued, the write data transfer is terminated. When the write data transfer is terminated, at least the operation of the write target ECU is suspended, so that it is possible to suppress a decrease in the battery remaining amount.

Here, in the second embodiment, S220 corresponds to a process as a calculator that operates during the execution of write data transfer, S230 and S240 correspond to a process as a determination unit operating during the execution of write data transfer.

Third Embodiment

Since the basic configuration of the third embodiment is similar to the first embodiment, the main difference will be described below. Note that the same reference numerals as those in the first embodiment indicate the same configuration, and refer to the preceding descriptions.

The third embodiment is different from the first embodiment in the following points.

A plurality of ECUs in the vehicle 3 are defined as the write target ECUs. In the following description, it is assumed that three ECUs 11 to 13 are the write target ECUs.

Priority is set for the write target data to be written to each of the ECUs 11 to 13. The higher the priority of the write target data is, the earlier the server 5 transmits the write target data. For this reason, the communication device 21 executes the write data transfer for each of the ECUs 11 to 13 in an earlier order as the write target ECU corresponds to the write target data with higher priority. That is, the execution order of the write data transfer for each write target ECU is the order of the priority of the write target data. In the following description, it is assumed that the write data transfer is performed in the order from ECU 11 to ECU 13 through ECU 12.

In the following description, for example, among the information put a symbol of A to C at the end such as the data amount X2A, X2B, X2C of the write target data, the information put a symbol of A relates to the information of the ECU 11. The information attached with B indicates the information relating to the ECU 12, and the information attached with C indicates the information relating to the ECU 13.

Figure 4:
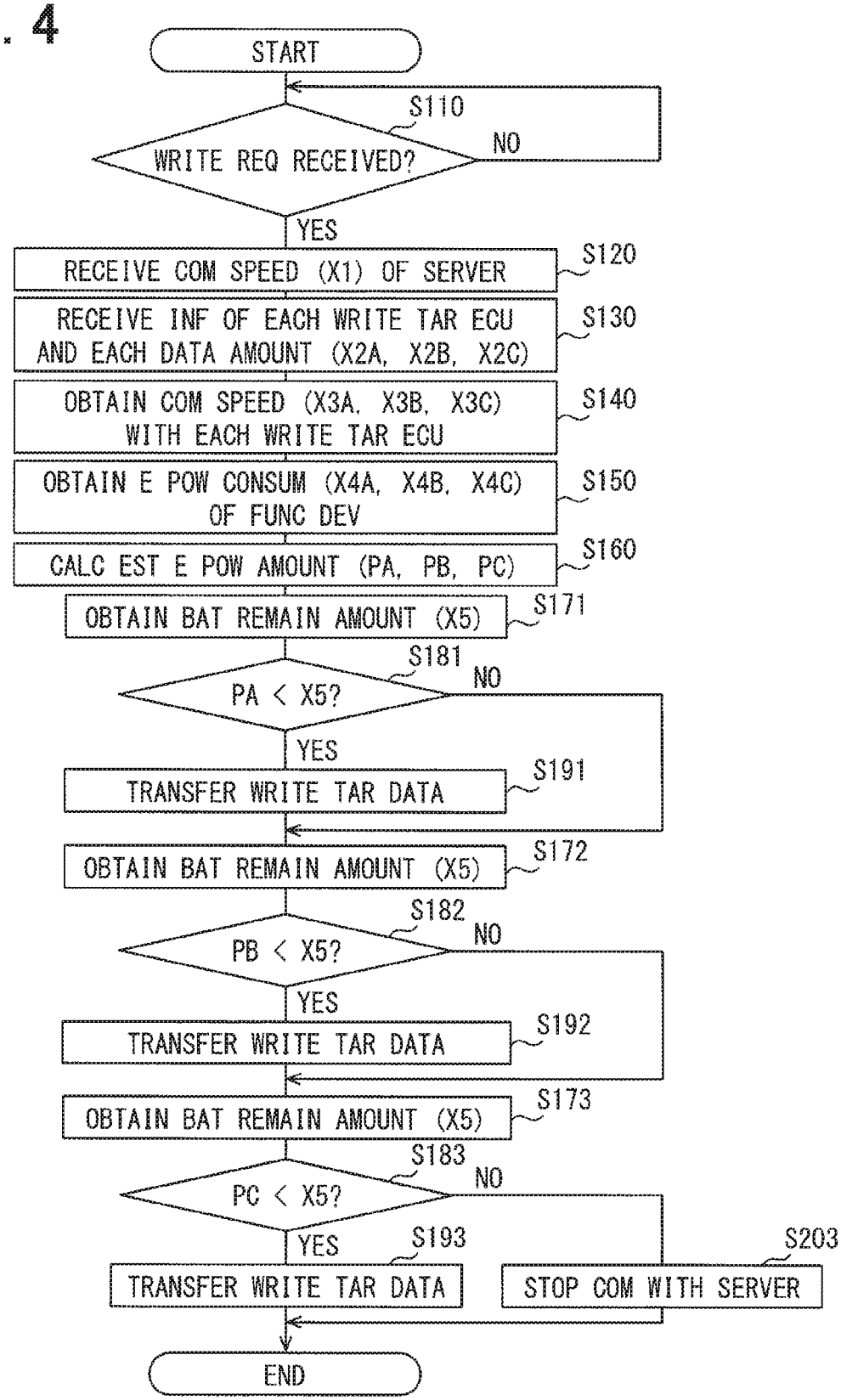
FIG. 4 is a flowchart of a process performed by a communication device according to a third embodiment.

The communication device 21 performs the process of FIG. 4 instead of the process of FIG. 2.

In steps S130 to S160 in FIG. 4, processes similar to those in steps S130 to S160 in FIG. 2 are performed with respect to each of the plurality of write target ECUs. For this reason, in FIGS. 4, S110 and S120 as well as S130 to S160 have the same step numbers as those in FIG. 2. Also, in FIG. 4, S171, S181, S191, S172, S182, S192, S173, S183, and S193 are similar to processes S170, S180, and S190 in FIG. 2.

As shown in FIG. 4, after receiving the communication speed X1 from the server 5 in S120, in S130, the communication device 21 acquires from the server 5 information indicating each write target ECU (that is, ECUs 11 to 13) and the data amounts X2A, X2B, X2C of the write target data for the write target ECUs. It should be noted that the communication device 21 also receives priority information for identifying the priority of each write target data from the server 5 at S140, and, based on the priority information, the communication device 5 determines the execution order of the write data transfer for each write target ECU. In this example, as described above, the execution order of the write data transfer for each write target ECU is in the order of "ECU 11→ECU 12→ECU 13".

In the next step S140, the communication device 21 acquires the communication speeds X3A, X3B, X3C between each writing target ECU and the communication device 21.

In the next step S150, the communication device 21 acquires the electric power consumption X4A, X4B, X4C of the operating device for writing data to each write target ECU.

In the next step S160, the communication device 21 calculates the estimated electric power amounts PA, PB, PC for each write target ECU, specifically, the estimated electric power amounts PA, PB, PC for data writing to each write target ECU.

Specifically, the communication device 21 calculates the estimated electric power amount PA of the ECU 11 by substituting X1, X2A, X3A, and X4A acquired by the process of S120 to S150 into equations 1 and 2, as described above. The estimated electric power amount PB for the ECU 12 and the estimated electric power amount PC for the ECU 13 are calculated in the same manner.

In step S171, the communication device 21 acquires the current battery remaining amount X5 from the monitor 25 in the same manner as step S170 in FIG. 2.

In step S181, the communication device 21 compares the battery remaining amount X5 acquired in step S171 with the estimated electric power amount PA calculated in step S160. Then, when it is determined in S181 that the battery remaining amount X5 is larger than the estimated electric power amount PA, the communication device 21 performs the write data transfer with respect to the first write target ECU (that is, the ECU 11), and then, the process proceeds to S191. In S191, the communication device 21 performs the write data transfer with respect to the ECU 11, and upon completion of the write data transfer, the process proceeds to S172. When the communication device 21 determines in S181 that the battery remaining amount X5 is not larger than the estimated electric power amount PA, the communication device 21 decides to stop the transfer of the write data for the first write target ECU, and then, the process directly proceeds to S172.

In S172, the communication device 21 again acquires the current battery remaining amount X5 from the monitor 25.

In step S182, the communication device 21 compares the battery remaining amount X5 acquired in step S172 with the estimated electric power amount PB calculated in step S160. Then, when it is determined in S182 that the battery remaining amount X5 is larger than the estimated electric power amount PB, the communication device 21 performs the write data transfer with respect to the second write target ECU (that is, the ECU 12), and then, the process proceeds to S192. In S192, the communication device 21 performs the write data transfer with respect to the ECU 12, and upon completion of the write data transfer, the process proceeds to S173. When the communication device 21 determines in S182 that the battery remaining amount X5 is not larger than the estimated electric power amount PB, the communication device 21 decides to stop the transfer of the write data for the second write target ECU, and then, the process directly proceeds to S173.

In S173, the communication device 21 again acquires the current battery remaining amount X5 from the monitor 25.

In step S183, the communication device 21 compares the battery remaining amount X5 acquired in step S173 with the estimated electric power amount PC calculated in step S160. Then, when it is determined in S183 that the battery remaining amount X5 is larger than the estimated electric power amount PC, the communication device 21 performs the write data transfer with respect to the third write target ECU (that is, the ECU 13), and then, the process proceeds to S193. In S193, the communication device 21 transfers the write data to the ECU 13, and upon completion of the write data transfer, the communication device 21 terminates the process of FIG. 4. When it is determined in S183 that the battery remaining amount X5 is not larger than the estimated electric power amount PB, the communication device 21 determines to stop the transfer of the write data for the third target ECU. Then, the process proceeds to S203, and the communication with the server 5 is suspended. Thereafter, the process of FIG. 4 is completed.

In the third embodiment, the communication device 21 calculates the estimated electric power amounts PA, PB, PC for each of the write target ECUs 11 to 13. Then, based on the estimated electric power amounts PA, PB, PC and the acquired battery remaining amount, the communication device 21 decides to execute or stop each write data transfer for each write target ECU 11 to 13. For this reason, it is possible to execute the writing of the data to each write target ECU as much as possible within a range that does not cause the exhaustion of the battery remaining amount.

Further, the communication device 21 acquires the battery remaining amount each time before performing the write data transfer (at S191, S192, and S193) for each write target ECU 11 to 13, and then, the communication device 21 compares the estimated electric power amount and the battery remaining amount with respect to the next ECU (hereinafter referred to as "scheduled write target ECU"), which is scheduled to perform the write data transfer. This process is realized by S171, S181, S172, S182, S173, and S183, respectively. Then, when it is determined that the battery remaining amount is larger than the estimated electric power amount, the communication device 21 transfers the write data to the scheduled write target ECU, and when it is determined that the battery remaining amount is not larger than the estimated electric power amount, the write data transfer for the scheduled write target ECU is suspended. For this reason, the determination whether to perform the write data transfer for each of the write target ECUs 11 to 13 is performed more correctly on the basis of the battery remaining amount immediately before the respective write data transfer is performed.

In the third embodiment, S191, S192, and S193 correspond to a process as a transfer unit that performs the write data transfer for each of a plurality of write target devices in a predetermined order. Then, S160 corresponds to the process as the calculator, and S171, S181, S172, S182, S173, and S183 correspond to the process as the determination unit.

Fourth Embodiment

Since the basic configuration of the fourth embodiment is similar to the first embodiment, the main difference will be described below. Note that the same reference numerals as those in the first embodiment indicate the same configuration, and refer to the preceding descriptions.

The fourth embodiment is different from the first embodiment in the following points.

Figure 5:
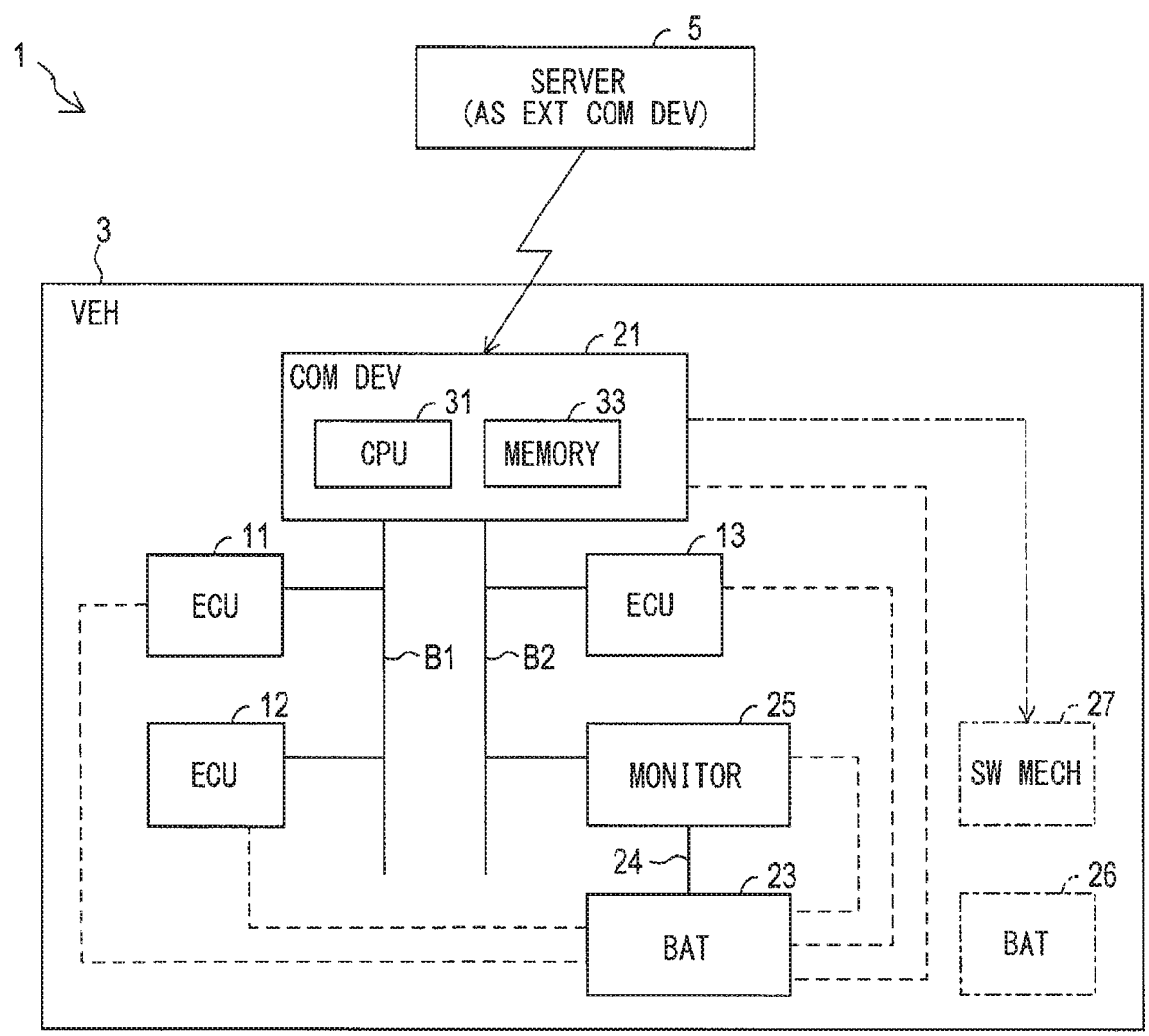
FIG. 5 is a block diagram showing a configuration of a data writing system according to a fourth embodiment.

As shown in FIG. 5, an auxiliary battery 26, which is a separate battery from the battery 23, is mounted on the vehicle 3. Furthermore, the vehicle 3 is also provided with a switching mechanism 27 for switching the power supply source to each device of the vehicle 3 between the battery 23 and the auxiliary battery 26. Switching control of the switching mechanism 27 is performed by the communication device 21. The battery remaining amount of the auxiliary battery 26 and the like are also monitored by the monitor 25. Normally, the battery 23 is used as a power supply source to each device.

Figure 6:
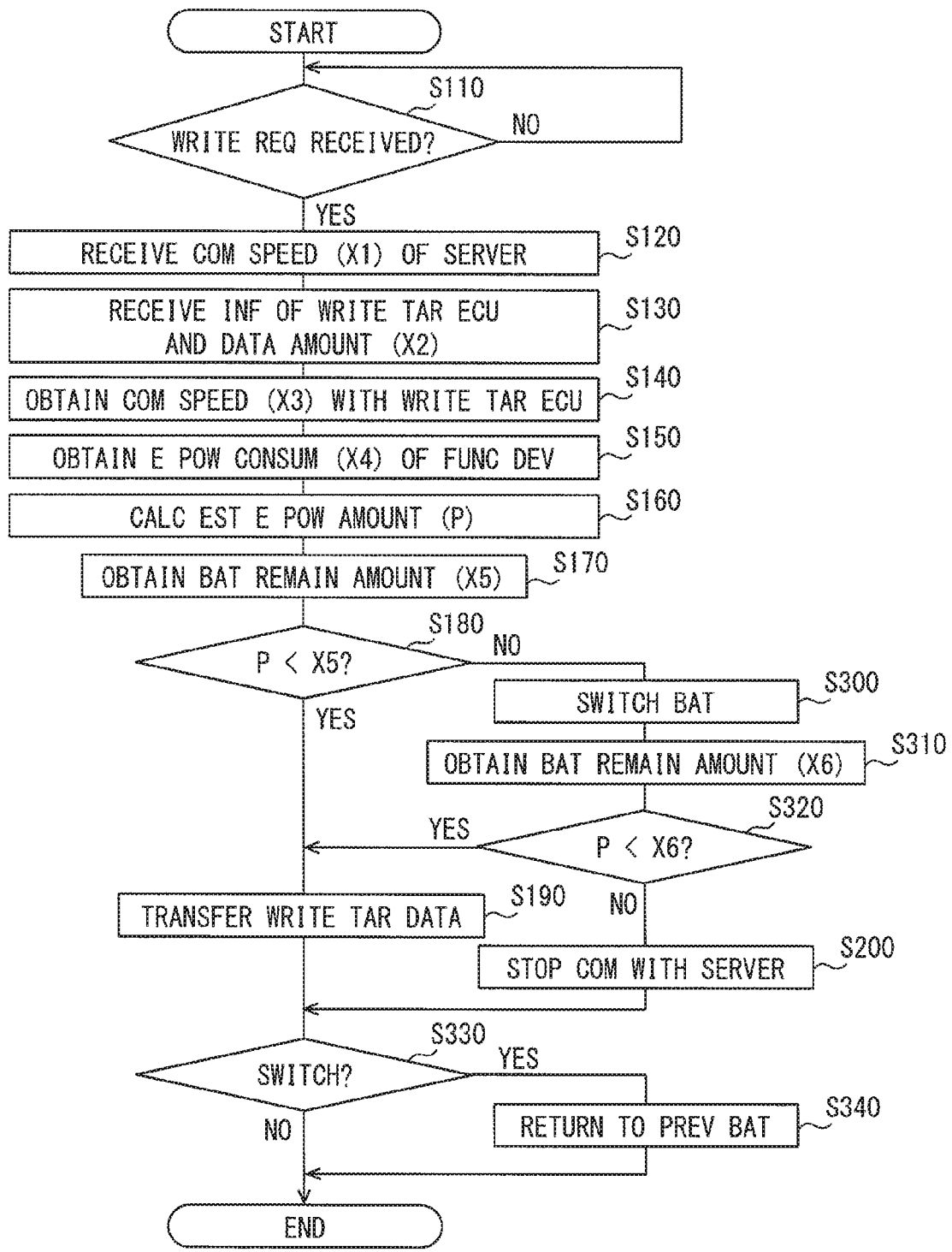
FIG. 6 is a flowchart of a process performed by the communication device of the fourth embodiment.

The communication device 21 performs the process of FIG. 6 instead of the process of FIG. 2. The process in FIG. 6 differs from the process in FIG. 2 in that S300 to S340 are added.

As shown in FIG. 6, when the communication device 21 determines in S180 that the battery remaining amount X5 is not larger than the estimated electric power amount P, the process proceeds to S300.

In S300, the communication device 21 switches the power supply source to each device of the vehicle 3 from the battery 23 to the auxiliary battery 26 by controlling the switching mechanism 27. Then, the communication device 21 acquires the battery remaining amount X6 of the auxiliary battery 26 from the monitor 25 in the next S310. In the next S320, the communication device 21 compares the battery remaining amount X6 acquired in S310 with the estimated electric power amount P calculated in S160, and in a case where it is determined that the battery remaining amount X6 is larger than the estimated electric power amount P, the process proceeds to S190 to perform the write data transfer. Then, when the communication device 21 completes the write data transfer, it proceeds to S330.

When the communication device 21 determines in S320 that the battery remaining amount X6 is not larger than the estimated electric power amount P, the communication device 21 proceeds to S200 without transferring the write data, and the process proceeds to S330 after the communication device 21 stops communicating with the server 5.

In S330, the communication device 21 determines whether the power supply source has been switched in S300. When it is determined that the switching is not performed, the communication device 21 ends the process of FIG. 6. When it is determined in S330 that the power supply source has been switched, the communication device 21 proceeds to S340 and controls the switching mechanism 27 to return the power supply source from the auxiliary battery 26 to the battery 23, and then, the communication device 21 terminates the process of FIG. 6.

According to the communication device 21 of the fourth embodiment, when it is determined in S180 that the battery remaining amount X5 of the battery 23 is not larger than the estimated electric power amount P, the power supply source is switched to the auxiliary battery 26 different from the battery 23 so that it is possible to perform the write data transfer. Therefore, it is possible to increase the possibility that the write data transfer, that is, the data writing to the write target ECU is performed.

In the fourth embodiment, S300 to S320 correspond to the process as the power securing unit.

Fifth Embodiment

Since the basic configuration of the fifth embodiment is similar to the first embodiment, the main difference will be described below. Note that the same reference numerals as those in the first embodiment indicate the same configuration, and refer to the preceding descriptions.

Figure 7:
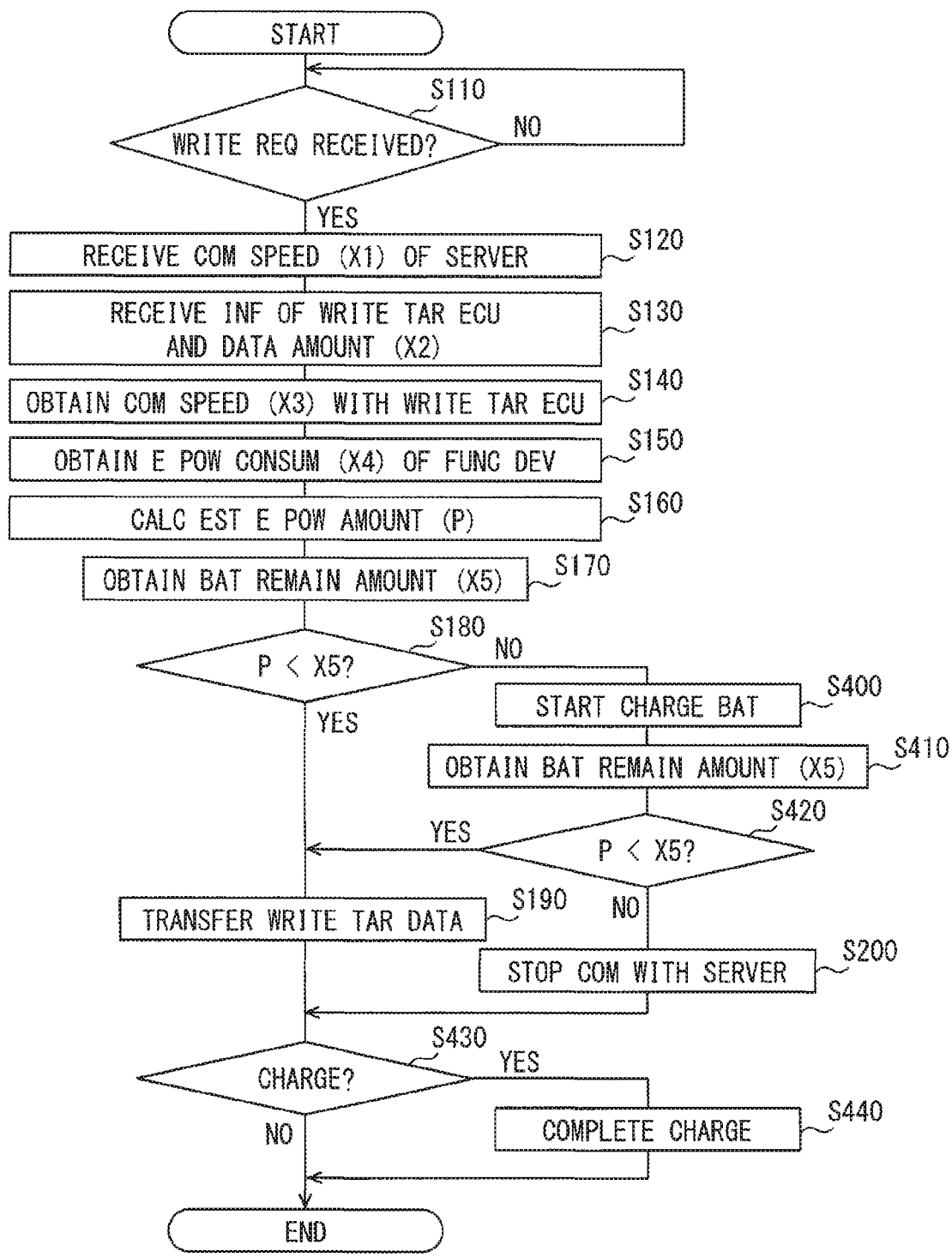
FIG. 7 is a flowchart of a process performed by a communication device according to a fifth embodiment.

Compared to the first embodiment, the communication device 21 of the fifth embodiment is different from the first embodiment in that the process of FIG. 7 is performed instead of the process of FIG. 2. The process in FIG. 7 differs from the process in FIG. 2 in that S400 to S440 are added.

As shown in FIG. 7, when the communication device 21 determines in S180 that the battery remaining amount X5 is not larger than the estimated electric power amount P, the process proceeds to S400.

The communication device 21 starts charging the battery 23 at S400. Specifically, the engine is started. Then, the communication device 21 waits for a predetermined time, and acquires the current battery remaining amount X5 from the monitor 25 in the next step S410. The battery remaining amount X5 obtained in S410 is the battery remaining amount of the battery 23 after being charged for a predetermined time.

In the next S420, the communication device 21 compares the battery remaining amount X5 acquired in S410 with the estimated electric power amount P calculated in S160, and in a case where it is determined that the battery remaining amount X5 is larger than the estimated electric power amount P, the process proceeds to S190 to perform the write data transfer. Then, when the communication device 21 completes the write data transfer, it proceeds to S430.

When the communication device 21 determines in S420 that the battery remaining amount X5 is not larger than the estimated electric power amount P, the communication device 21 proceeds to S200 without transferring the write data, and the process proceeds to S430 after the communication device 21 stops communicating with the server 5.

In step S430, the communication device 21 determines whether the battery 23 has been charged in step S400, that is, whether the engine has been started. When it is determined that the charging has not been performed, the communication device 21 terminates the process of FIG. 7.

When it is determined that the charging has been performed in S430, the communication device 21 proceeds to S440, and then, the communication device 21 terminates the charging of the battery 23 by stopping the engine, and thereafter ends the process of FIG. 5.

Here, the start and stop of the engine by the communication device 21 may be realized by transmitting a command signal from the communication device 21 to the ECU for controlling the starter and the engine.

When the communication device 21 of the fifth embodiment determines NO in S180, that is, when determining that the battery remaining amount X5 is not larger than the estimated electric power amount P, the communication device 21 starts the engine and charges the battery 23. Then, the communication device 21 obtains the battery remaining amount X5 of the battery 23 after being charged for a predetermined time. Then, when the communication device 21 determines that the battery remaining charge X5 after charging is larger than the estimated electric power amount P, the communication device 21 proceeds to S190 even when determining NO in S180, so that the communication device 21 performs the write data transfer. That is, the communication device 21 cancels the stop of the write data transfer due to the determination of NO in S180, and performs the write data transfer. Therefore, it is possible to increase the possibility that the write data transfer, that is, the data writing to the write target ECU is performed.

In the fifth embodiment, steps S400 to S420 correspond to process as a power securing unit different from the fourth embodiment.

Other Embodiments

Although the embodiments of the present disclosure have been described above, the present disclosure is not limited to the embodiments described above, and various modifications can be made to implement the present disclosure.

For example, in the fourth embodiment, when it is determined as NO in S180 of FIG. 6, the similar process as in S310, and S320 may be performed before S300, and when determining that the battery remaining amount X6 of the auxiliary battery 26 is larger than the estimated electric power amount P, the process of S300 may be performed and then, the process of S190 may be performed.

Also in each of the third to fifth embodiments, during the execution of the write data transfer, process similar to the process in FIG. 3 in the second embodiment may be performed.

In the third embodiment, when it is determined as NO in any one of S181, S182, and S183 in FIG. 4, the similar process as S300 to S320 in FIG. 6 in the fourth embodiment may be performed, and, when it is determined that the battery remaining amount X6 of the auxiliary battery 26 is larger than the estimated electric power amount, the write data transfer may be performed. Further, in the third embodiment, when it is determined as NO in any one of S181, S182, and S183 in FIG. 4, the similar process as S400 to S420 in FIG. 7 in the fifth embodiment may be performed, and, when it is determined that the battery remaining amount X5 is larger than the estimated electric power amount, the write data transfer may be performed.

Further, as a modification of the third embodiment, before executing the write data transfer for all the write target ECUs, the communication device 21 may determine how many ECUs the communication device 21 can write the data, based on the estimated electric power amount for each write target ECU calculated in S160 and the battery remaining amount. In this case, the communication device 21 may be configured to perform the write data transfer with respect to the ECUs determined to be able to write the data.

Further, the communication device 21 may have a function of calculating the battery remaining amount of the batteries 23, 26.

For example, in S180 of FIG. 2, when the difference value which is a value obtained by subtracting the estimated electric power amount P from the battery remaining amount X5 is larger than the positive predetermined value, the communication device 21 may determine that the battery remaining amount X5 is larger than the estimated electric power amount P. Conversely, the communication device 21 may be configured to determine that the battery remaining amount X5 is not larger than the estimated electric power amount P unless the difference value is larger than the predetermined value. Such modification may be similarly applied to other steps for making the same determination as in S180.

A plurality of functions of one element in the above embodiment may be implemented by a plurality of elements, or one function of one element may be implemented by a plurality of elements. Alternatively, a plurality of functions including a plurality of components may be realized by one component, or a function realized by a plurality of components may be realized by one component. Alternatively, a part of the configuration of the above embodiment may be omitted. At least a part of the configuration of the above embodiment may be added to or replaced with another configuration of another embodiment.

In addition to the communication device 21 described above, various features such as a system having the communication device 21 as a component, a program for making the computer function as the communication device 21, a non-transitory tangible storage medium such as a semiconductor memory in which the program is stored, and a method of transferring write target data may provide to realize the present disclosure.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular communication device communicable with an external communication device disposed outside a vehicle and at least one electronic control unit mounted in the vehicle, the vehicular communication device comprising:

a processor with memory configured to:
receive a write target data, which is to be written in at least one write target device among the at least one electronic control unit, from the external communication device; and transmit the write target data to the at least one write target device so as to write the write target data into the at least one write target device;
wherein the processor calculates an estimated electric power amount as an estimated value of an electric power consumption in the vehicle, which is required for transmitting and writing the write target data from the external communication device into to the write target device via the vehicular communication device;
obtains a battery remaining amount which is an electric power amount stored in a battery as a power supply source for supplying electric power to the at least one electronic control unit and the vehicular communication device; and
determines whether the write data transfer is executed or suspended, based on an obtained battery remaining amount and the estimated electric power amount calculated by the processor, wherein the processor calculates the estimated electric power amount according to at least:
a first communication speed between the external communication device and the vehicular communication device;
a second communication speed between the write target device and the vehicular communication device; and
electric power consumption of the write target device and the vehicular communication device.

2. The vehicular communication device according to claim 1, wherein:
the processor is further configured to:
execute the write data transfer when determining that the obtained battery remaining amount is larger than the estimated electric power amount, based on the obtained battery remaining amount and the estimated electric power amount calculated by the processor; and
suspend the write data transfer when determining that the obtained battery remaining amount is not larger than the estimated electric power amount, based on the obtained battery remaining amount and the estimated electric power amount calculated by the processor.

3. The vehicular communication device according to claim 2, wherein:
the processor is further configured to:
switch the power supply source to another battery different from the battery when the processor determines that the battery remaining amount is not larger than the estimated electric power amount; and
perform the write data transfer.

4. The vehicular communication device according to claim 2, wherein:
the processor is further configured to:
charge the battery when the processor determines that the battery remaining amount is not larger than the estimated electric power amount;
determine whether the battery remaining amount of the battery which is charged for a predetermined time is larger than the estimated electric power amount; and
perform the write data transfer when determining that a charged battery remaining amount is larger than the estimated electric power amount.

5. The vehicular communication device according to claim 1, wherein:
the processor calculates necessary time for transferring the write target data from the external communication device to the write target device using the first communication speed, the second communication speed, and the data amount; and
the processor calculates the estimated electric power amount according to a calculated necessary time and the electric power consumption.

6. The vehicular communication device according to claim 1, wherein:
the processor calculates the estimated power amount and determines whether the write data transfer is executed or suspended before the processor starts a write data transfer.

7. The vehicular communication device according to claim 1, wherein:
the processor is configured to repeatedly operate the calculation of the estimated power amount and the determination of whether the write data transfer is executed or suspended in a period when the processor performs a write data transfer; and
the processor is configured to calculate the estimated electric power amount from a present time in the period that the processor calculates the estimated power amount and determines whether the write data transfer is executed or suspended.

8. The vehicular communication device according to claim 1, wherein:
the processor transmits the write target data for each of the plurality of write target devices in a predetermined order when the at least one write target device includes a plurality of write target devices;
the processor is configured to calculate the estimated electric power amount for each of the plurality of write target devices; and
the processor determines whether the write data transfer for each of the write target devices is executed or suspended, based on each estimated electric power amount calculated by the processor and an obtained battery remaining amount.

9. The vehicular communication device according to claim 8, wherein:
the predetermined order is a priority order of the write target data for each of the write target devices.

* * * * *